(No Model.)

C. RONEY.
DRAIN TILING.

No. 545,535. Patented Sept. 3, 1895.

Attest
Helen Graham
William Graham

Inventor
Charles Roney
By L. P. Graham
his attorney

UNITED STATES PATENT OFFICE.

CHARLES RONEY, OF BETHANY, ILLINOIS.

DRAIN-TILING.

SPECIFICATION forming part of Letters Patent No. 545,535, dated September 3, 1895.

Application filed March 13, 1895. Serial No. 541,642. (No model.)

*To all whom it may concern:*

Be it known that I, CHARLES RONEY, of Bethany, in the county of Moultrie and State of Illinois, have invented certain new and useful Improvements in Drain-Tiling, of which the following is a specification.

This invention is designed to provide for an extended use of drain-tiling on farm lands. It is exemplified in the structure hereinafter described, and it is defined in the appended claim.

Figure 1:
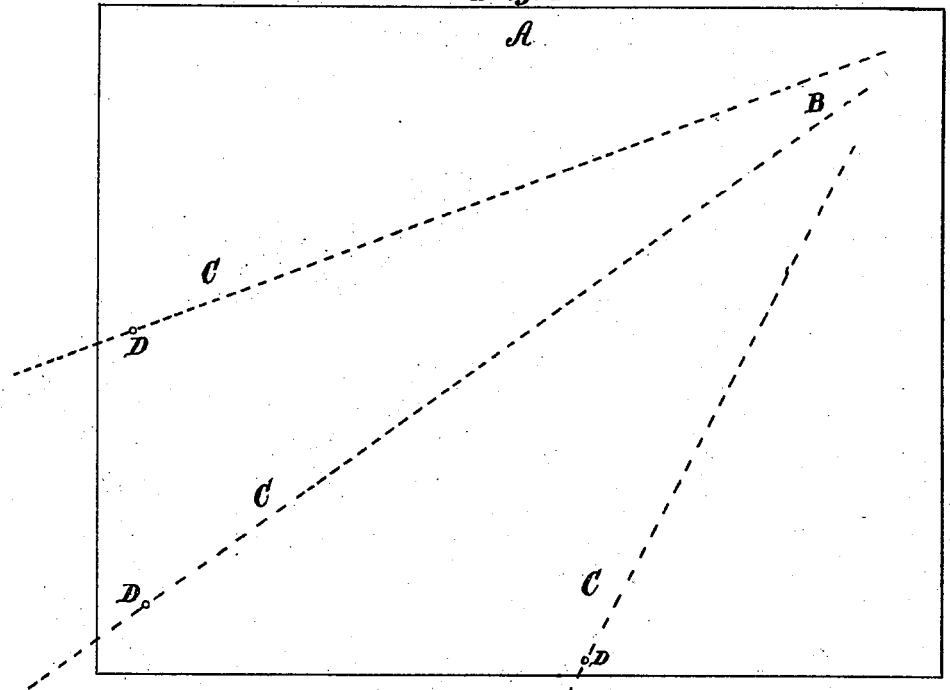
Figure 2:
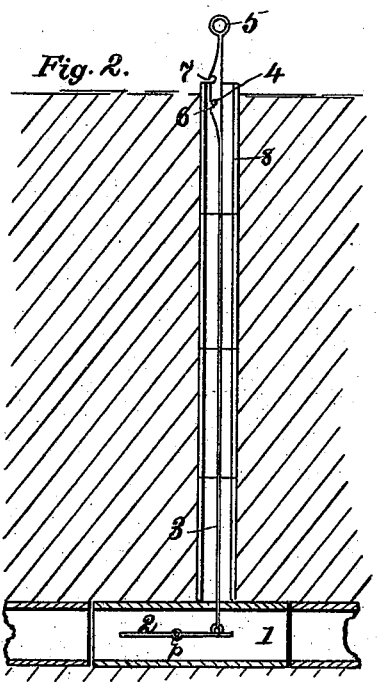
Figure 3:
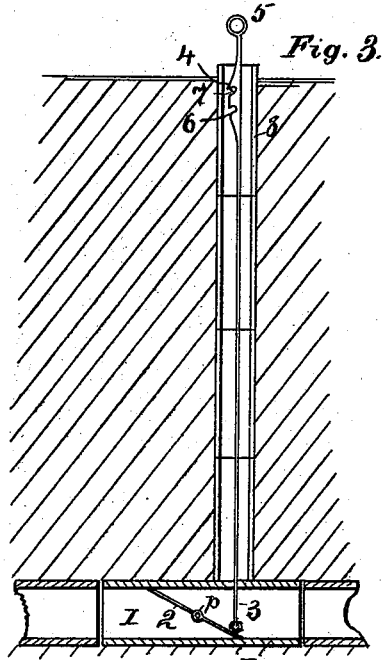

In the drawings forming part of this specification, Figure 1 is a diagram showing a plat of land provided with my improvement, and Figs. 2 and 3 are sections showing details of construction.

The plat of land indicated at A may, for the purposes of this description, be supposed to be more in need of drainage at B than at C C C and to be tiled in the directions shown by the broken lines.

At D D D are placed sections of tile, as 1 in Figs. 2 and 3, each provided with a valve, as 2, wholly within the tile 1, and a valve-rod, as 3. The valve-rod extends to the surface of the ground, or nearly so, and it has notches, as 6 and 7, in one of its sides. It is incased loosely by a tube, as 8, which is preferably built up of sections of tile, and a cross-rod 4 extends from side to side of the tube. The position of the cross-rod corresponds to the notches of the valve-rod in such manner that when the upper notch engages the cross-rod the valve will be closed, as shown in Fig. 3, and when the lower notch engages the cross-rod the valve will be held open, as shown in Fig. 2.

The valved section is preferably made of cast metal, and the valve is swung on a central pivot *p* within said section.

In operation the valves are left open so long as the ground requires free drainage and are closed as soon as this condition passes. As the tiling is several feet below the surface of the ground it will continue to receive water after the surface is comparatively dry, and this will accumulate above the valved sections and be gradually absorbed by the surrounding ground. The vertical tubes are large enough to permit observation of the condition of the water in the soil around the tiling, and whenever the stand of water in the tubes shows a superfluous, or injurious, accumulation, the valves, or either of them, may be opened. As a result of the improvement the surplus water of wet spells may in part be saved to bridge over dry spells, and the water from land most in need of drainage may be supplied, to some extent, to drier land.

Having thus described my invention, I claim as new and desire to secure by Letters Patent—

The combination in a line of drain tile, of a cylindrical valved section having two diametrically located pivot supports in its sides, a valve 2 balanced wholly within said section and having its pivots half way of its length, an observation tube above the valved section, a cross rod in said tube, and a valve rod also in the observation tube and having notches in its upper end and its lower end secured to the balanced valve 2 substantially as described.

In testimony whereof I sign my name in the presence of two subscribing witnesses.

CHARLES RONEY.

Attest:
T. A. BONE,
L. R. GRAHAM.